United States Patent [19]
Le Strat et al.

[11] Patent Number: 5,559,829
[45] Date of Patent: Sep. 24, 1996

[54] METHOD OF CONSTRUCTING A SPREADING CODE ASSOCIATED WITH ONE USER OF A DIRECT SEQUENCE CODE DIVISION MULTIPLE ACCESS DIGITAL TRANSMISSION SYSTEM AND CORRESPONDING METHOD OF GENERATING A TABLE

[75] Inventors: Evelyne Le Strat, Paris; René Olivier, St Germain de la Grange, both of France

[73] Assignee: Alcatel Mobile Communication France, Paris, France

[21] Appl. No.: 338,114

[22] Filed: Nov. 9, 1994

[30] Foreign Application Priority Data

Nov. 10, 1993 [FR] France .................... 93 13477

[51] Int. Cl.⁶ .......................... H04B 1/707; H04J 13/04; G06F 7/58
[52] U.S. Cl. .......................... 375/206; 370/18; 364/717
[58] Field of Search .................... 375/200, 205, 375/206; 370/18, 19; 380/46; 327/164; 364/717

[56] References Cited

U.S. PATENT DOCUMENTS

| | | | |
|---|---|---|---|
| 4,755,987 | 7/1988 | Lee et al. | 370/18 |
| 4,872,200 | 10/1989 | Jansen | 380/46 |
| 5,157,686 | 10/1992 | Omura et al. | 375/200 |
| 5,166,952 | 11/1992 | Omura et al. | 375/200 |
| 5,210,770 | 5/1993 | Rice . | |
| 5,313,457 | 5/1994 | Hostetter et al. | 375/200 |
| 5,327,455 | 7/1994 | De Gaudenzi et al. | 375/205 |

FOREIGN PATENT DOCUMENTS

| | | |
|---|---|---|
| 0563020A2 | 9/1993 | European Pat. Off. . |
| 36212 | 2/1989 | Japan ................... 364/717 |
| WO8700370 | 1/1987 | WIPO . |

OTHER PUBLICATIONS

Karkkainen & Leppanen, "Comparison of the Performance of Some Linear Spreading Code Families for Asynchronous DS/SSMA Systems", *Milcom 91, Conference Record*, vol. 2, 1991, pp. 784–790.

Soljanin et al, "Spread-Sprectrum Road–Automobile Communications", *Proc. of the 1991 American Control Conf.*, vol. 3, 28 Jun. 1991, pp. 2557–2562.

*Patent Abstracts of Japan*, vol. 16, No. 488 (E–1277) 9 Oct. 1992 & JP-A-04 179 324 (Yamaha Corp) 26 Jun. 1992.

*Patent Abstracts of Japan*, vol. 11, No. 198 (E–519) 25 Jun. 1987 & JP-A-62 023 634 (NEC Home Electronics Ltd) 31 Jan. 1987.

French search Report FR 9313477.

Primary Examiner—Stephen Chin
Assistant Examiner—Jeffrey W. Gluck
Attorney, Agent, or Firm—Sughrue, Mion, Zinn, Macpeak & Seas

[57] ABSTRACT

A method of constructing a spreading code associated with one user of a direct sequence code division multiple access digital transmission system includes at least one stage of concatenating a plurality of different sub-codes. Specifically, the spreading code is constructed by concatenating at least two different, in particular, cyclically different, basic sub-codes belonging to the same family of basic sub-codes, and at least one secondary sub-code obtained by circular permutation of one of the basic sub-codes. The constructed spreading code is then designated as being associated with the one user.

16 Claims, 1 Drawing Sheet

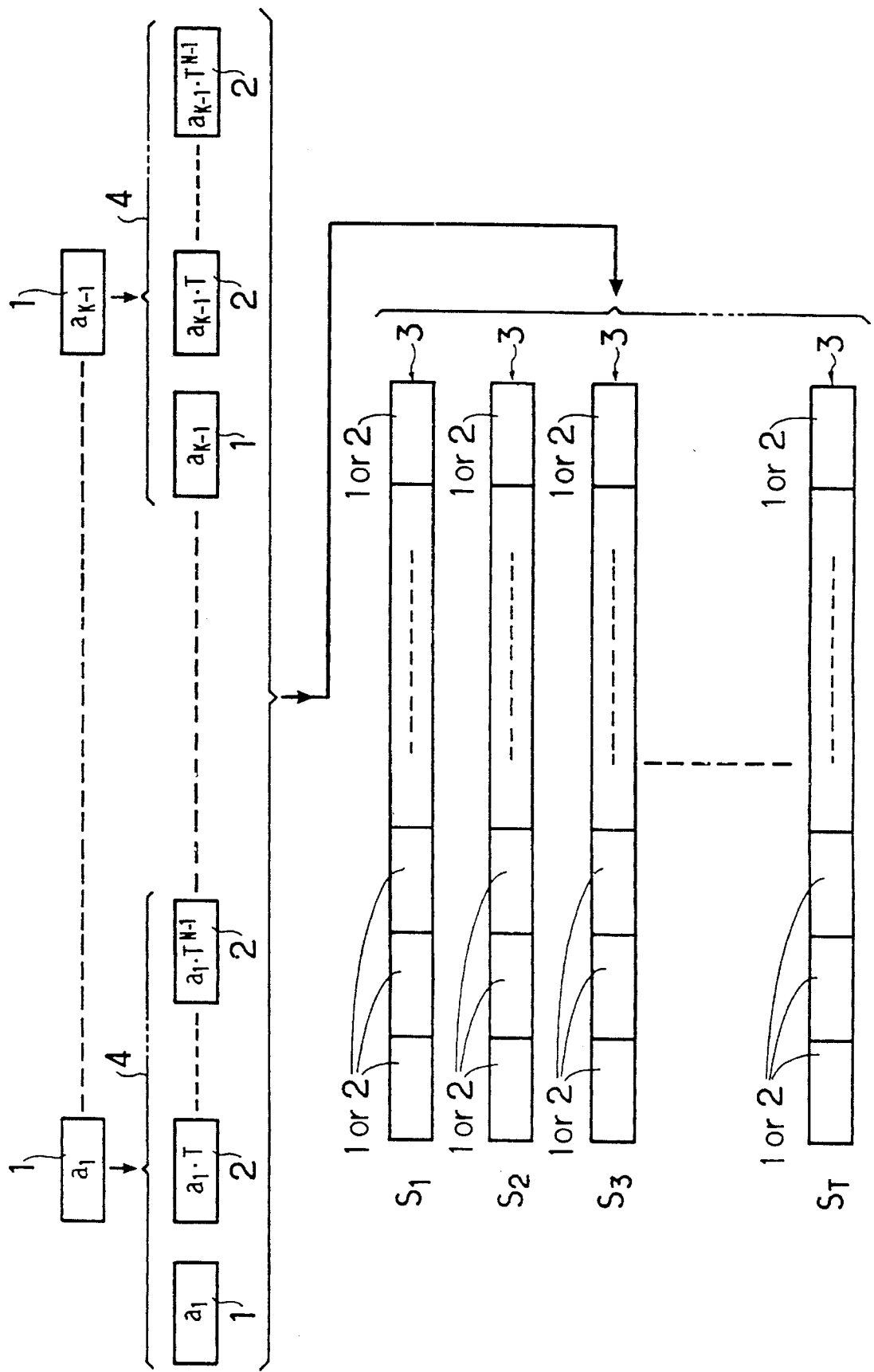

METHOD OF CONSTRUCTING A SPREADING CODE ASSOCIATED WITH ONE USER OF A DIRECT SEQUENCE CODE DIVISION MULTIPLE ACCESS DIGITAL TRANSMISSION SYSTEM AND CORRESPONDING METHOD OF GENERATING A TABLE

BACKGROUND OF THE INVENTION

1. Field of the Invention

The field of the invention is that of digital transmission, especially to mobiles. To be more precise, the invention concerns a method of constructing a spreading code associated with one user of a direct sequence code division multiple access (DS-CDMA) digital transmission system.

2. Description of the Prior Art

There are three major types of multiple access digital transmission systems, known as FDMA, TDMA and CDMA.

Historically, Frequency Division Multiple Access (FDMA) was the first of these systems to be used. It entails separating the calls to be transmitted by assigning each call a specific frequency band which can easily be separated from the others by filtering at the receiving end.

It is little used nowadays because it requires a receiver for each transmission channel used, so that a considerable number of receivers are required in a central station if it is to be possible to converse simultaneously with a large number of distributed stations.

The principle of Time Division Multiple Access (TDMA) is to time share the whole of the transmission channel. To prevent information overlapping, only one station sends at a time and, when it does send, it occupies all of the channel bandwidth.

TDMA systems encounter difficult problems with equalization if the transmission channel is disrupted by echoes or by jamming.

Finally, the Code Division Multiple Access (CDMA) system uses spread spectrum techniques.

One spectrum spreading technique is the direct sequence (DS-CDMA) technique which entails sending a signal $s(t)$ obtained by multiplying a digital data signal $d(t)$ by a spreading code $g(t)$. The signal $d(t)$ is characterized by its frequency, called the bit frequency. The spreading code $g(t)$, which is specific to its user, is a pseudo-random signal characterized by its frequency, called the chip frequency. This frequency is greater than the bit frequency by a factor $G$ known as the spreading gain or bandwidth expansion factor. The following equations apply:

data signal $d(t)$:

$$d(t) = \sum_{k=-\infty}^{k=+\infty} d_k \delta(t - kT_b)$$

spreading code $g(t)$:

$$g(t) = \sum_{k=-\infty}^{k=+\infty} g_k \delta(t - kT_c)$$

signal to be transmitted $s(t)$:

$$s(t) = \sum_{k=-\infty}^{k=+\infty} d_{[\frac{k}{G}]} g_k \delta(t - kT_c)$$

where:

$T_b$ is the reciprocal of the bit frequency;
$T_c$ is the reciprocal of the chip frequency;
$d_k$ is the k(th) element of the summation for $d(t)$;
$g_k$ is the k(th) element of the summation for $g(t)$;
[ ] is the integer part.

Decoding at the receiving end entails combining the received signal with a local replica of $g(t)$ synchronized to the transmission.

In a DS-CDMA system there must be many spreading codes of the same family so that a large number of users can each have a different spreading code. The spreading codes must also be long enough to provide a specified minimal level of security against intentional jading, combined with confidentiality of transmission.

The invention applies mainly to the situation in which the receiving device is a diversity receiver, also known as a rake receiver.

It can be shown that with a rake receiver optimizing receive performance in the presence of multi-user interference requires the use of spreading codes having good partial aperiodic cross-correlation properties and that optimizing receive performance in the presence of intersymbol interference requires the use of spreading codes having good partial aperiodic autocorrelation properties.

In this context, "partial" means that the correlation is not effected over all of the period of the spreading code, and "aperiodic" means that the correlation is not effected merely by shifting two codes and correlating over a predetermined number of elements, but by correlating between elements corresponding to the same bits.

Partial aperiodic autocorrelation over a maximal number $G$ of elements (where $G$ is the spreading factor) of a code $a_i$, for a starting index $k_1$ and offset $k_2$, can be defined using the following equation, for example:

$$A_i(k_1, k_2) = \sum_{k=0}^{N-1-k_2 \bmod G} a_i(k_1+k) \cdot a_i(k_1+k_2+k)$$

for $k_2 \geq 0$ $$A_i(k_1, k_2) = \sum_{k=0}^{-k_2 \bmod G - 1} a_i(k_1+k) \cdot a_i(k_1+k_2+k)$$

for $k_2 < 0$

In the above equations, "mod" represents the mathematical function "modulo".

Likewise, partial aperiodic cross-correlation over a maximal number $G$ of elements between two codes $a_i$ and $a_m$ for a starting index $k_1$ and an offset $k_2$ can be defined by the following equation, for example:

$$I_{i,m}(k_1, k_2) = \sum_{k=0}^{N-1-k_2 \bmod G} a_i(k_1+k) \cdot a_m(k_1+k_2+k)$$

for $k_2 \geq 0$ $$I_{i,m}(k_1, k_2) = \sum_{k=0}^{-k_2 \bmod G - 1} a_i(k_1+k) \cdot a_m(k_1+k_2+k)$$

for $k_2 < 0$

The prior art spreading codes usually employed in conventional DS-CDMA systems have good correlation properties only if the correlations are effected over the entire period of the spreading codes. These prior art spreading codes, described for example in the document "Coherent Spread Spectrum Systems", J. K. Holmes, Wiley Interscience 1992 include the Gold and Kasami codes, for example.

Consequently, these prior art spreading codes cannot optimize the performance of a rake receiver since this requires spreading codes having good partial and aperiodic correlation properties.

In the specific case of an inversion type DS-CDMA system, i.e., when the spreading factor (or band expansion factor) is equal to the period of the spreading code, other types of code have been used in the prior art, namely structured codes.

Structured codes, described for example in the document "New signature code sequence design for CDMA systems", T. O'Farrell, Electronic Letters, 14 Feb. 1991, Vol. 27, are obtained by concatenating sub-codes (sometimes called short codes). The various sub-codes are obtained by circular permutation of a single starting sub-code. In other words, for a given structured code all of the sub-codes are the same except for their circular permutation.

These structured codes have particular correlation properties, especially aperiodic correlation properties. They have various drawbacks, however.

If L is the period of the original sub-code, there are L possible circular permutations. The period L' of the structured code is, therefore, at most equal to $L^2$ ($L' \leq L^2$). Structured codes, therefore, have the drawback of being relatively short and cannot achieve good confidentiality.

Also, the maximal number of structured codes in the same family, and therefore, the maximal number of users, is limited by K, the number of available cyclically different sub-codes. To construct a structured code associated with one user a single basic sub-code is concatenated several times with different phases.

An object of the invention is to palliate these various drawbacks of the prior art.

To be more precise, an object of the invention is to provide a method of constructing a family of spreading codes for a DS-CDMA system, with many spreading codes in the same family, of great length, and having good aperiodic partial autocorrelation and cross-correlation properties.

Thus an object of the invention is to provide spreading codes which optimize the performance of a rake receiver, especially in the presence of multi-user interference and intersymbol interference.

SUMMARY OF THE INVENTION

This object, and others that will emerge below, are achieved in accordance with the invention by a method of constructing a spreading code associated with one user of a direct sequence code division multiple access digital transmission system, said method including at least one stage of concatenating a plurality of different sub-codes, namely:

at least two different basic, in particular cyclically different, sub-codes belonging to the same family of basic sub-codes; and at least one secondary sub-code obtained by circular permutation of one of said basic sub-codes.

The invention, therefore, consists in constructing the spreading codes (long codes) by concatenating sub-codes (short codes) derived from basic sub-codes belonging to the same-family of sub-codes but different from each other. These sub-codes are either basic sub-codes or secondary sub-codes obtained by circular permutation of one of the basic sub-codes.

The basic sub-codes of the same family are cyclically different, i.e., different from each other even if subject to circular permutation.

In accordance with the invention, partial aperiodic cross-correlation between two spreading codes for starting indices which are multiples of the spreading factor amounts to aperiodic cross-correlation between the two sub-codes which are part of these two spreading codes and correspond to the times defined by these indices.

Consequently, in accordance with the invention, partial aperiodic cross-correlation for starting indices that are multiples of the spreading factor is equivalent either to aperiodic cross-correlation between two different sub-codes or to aperiodic autocorrelation on one sub-code.

The spreading codes (long codes), therefore, inherit the aperiodic cross-correlation or autocorrelation properties of the sub-codes (short codes) for aperiodic partial cross-correlations of the spreading codes.

Likewise, in accordance with the invention, partial aperiodic autocorrelation on a spreading code is equivalent to aperiodic autocorrelation on a sub-code.

Thus, by choosing a family of basic sub-codes which have good aperiodic cross-correlation and autocorrelation properties over their entire period it is possible to construct a family of spreading codes with good partial aperiodic cross-correlation and autocorrelation properties.

By "good correlation properties" is meant the lowest possible autocorrelation for a non-null offset and the lowest possible cross-correlation for two different codes.

These spreading codes can therefore optimize the receive performance of a DS-CDMA system, because these spreading codes can limit multi-user interference and intersymbol interference.

The period of said sub-codes is advantageously equal to the spreading gain of said transmission system.

Partial correlations over the length of the sub-codes are therefore effected over a length corresponding to the spreading factor.

Unlike the structured codes previously mentioned, this is not an inversion type system, in which the band expansion factor (spreading gain) is equal to the period of the spreading code (long code) and therefore equal to several times the period of the sub-codes (short codes).

Said family of basic sub-codes preferably belongs to the group comprising:

the family of Gold codes; and the family of Kasami codes.

These codes have very good aperiodic cross-correlation and autocorrelation properties over their entire period. They can, therefore, be used as basic sub-codes for constructing a family of spreading codes with good partial aperiodic auto-correlation and cross-correlation properties.

Bit error rate performance is improved, and the length of the spreading codes is reasonable.

Said spreading code advantageously belongs to a family of at least two separate spreading codes, said spreading code being written:

$$S_k = \sum_{q=0}^{n-1} TP_k^{(q)} \cdot a_{ck^{(q)}}$$

where:

k is the index of said spreading code in said family;

$\Sigma$ signifies concatenation;

q is the concatenation index;

n is the concatenation factor, i.e., the total number of sub-codes to be concatenated to form said spreading codes;

$T^x$ is a circular permutation of x elements;

$a_y$ is a basic sub-code of a family $\{a_y\}$ of basic sub-codes which can be used to construct the sub-codes to be concatenated;

$c_k(q)$ is the function indicating the basic sub-code to be used to construct the $q^{th}$ sub-code to be concatenated in said $k^{th}$ spreading code;

$p_k(q)$ is the function indicating the number of permutations to be effected on the basic sub-code $a_y$ to be considered, with $y=c_k(q)$.

Accordingly, when it is obtained by concatenating n different sub-codes, a spreading code is defined by n pairs $(p_k(q), c_k(q))$, where $q \in [0, n-1]$.

Said method advantageously includes a step of associating a pair $(p_k(q), c_k(q))$ with each value of q.

Said step of associating a pair $(p_k(q), c_k(q))$ with each value of q is preferably such that the same sub-code cannot have the same concatenation rank in said spreading code and in any other spreading code of said family of spreading codes.

Using the same notation, this condition can be written:

$(p_k(q), c_k(q)) \neq (p_j(q), c_j(q))$ for $k \neq j$.

Said step of associating a pair $(p_k(q), c_k(q))$ with each value of q is preferably such that the same sub-code cannot be present more than once in said spreading code (3).

This condition can also be written:

$(p_k(q), c_k(q)) \neq (p_k(j), c_k(j))$ for $q \neq j$.

The spreading codes of the invention are therefore longer and more numerous in each family than the structured codes.

If N denotes the period of the sub-codes (also equal to the band expansion factor), and K denotes the number of basic sub-codes which are cyclically different (i.e., which cannot become equal, even as a result of circular permutation), the maximal period of each spreading code is $N^2K$. It is possible to apply N permutations to the basic sub-codes since their period is N. There are therefore NK possible pairs $(p_k, c_k)$, i.e., a total of NK different sub-codes. The period of a sub-code being N, the maximal period of a spreading code is therefore $N(NK)=N^2K$.

In comparison, for structured codes the maximal period is $N^2$. In this case, a single "basic sub-code" of length N being used, there are N possible circular permutations and therefore N different possible sub-codes.

The period of a sub-code being N, the maximal period of a spreading code is therefore $N(N)=N^2$.

In a first advantageous embodiment of the invention, said step of associating a pair $(p_k(q), c_k(q))$ with each value of q entails calculating said values $p_k(q)$ and $c_k(q)$ using a function parameterized by said index k of said spreading codes in said family.

Accordingly, only the pairs $(p_k(q), c_k(q))$ needed for constructing this spreading code are calculated, and this only when they are needed.

In a second advantageous embodiment of the invention said stage of associating a pair $(p_k(q), c_k(q))$ with each value of q entails reading said values pk(q) and $c_k(q)$ in a table previously generated using a function parameterized by said index k of said spreading codes in said family.

The invention also concerns a method of generating a table of the type used in a method of constructing a spreading code as described above, said table associating, for each of said spreading codes indexed by k, a pair of values $(p_k(q), c_k(q))$ with each concatenation index q, said method of generating a table including the following stages:

choosing a number K of available basic sub-codes;

generating pairs $(p_k(q), c_k(q))$ iteratively from the spreading code index k in said family and then from the concatenation index q, said iterative generation entailing:

* choosing a variable $V_k(q)=p_k(q)*K+c_k(q)$ where $V_k(q)$ is the smallest integer such that:

$V_k(q) < K.N$ where N is said period of the sub-codes;

$V_k(q) \neq V_k(q')$ for all $q' < q$, where q' corresponds to all values of q for which a pair $(p_k(q), c_k(q))$ has already been calculated;

$V_{k'}(q) \neq V_k(q)$ for all $k' < k$, where k' corresponds to all values of k for which a pair $(p_k(q), c_k(q))$ has already been calculated;

* effecting the integer division of $V_k(q)$ by K to obtain the values $p_k(q)$ and $c_k(q)$.

This construction stage is therefore iterative and can calculate all of the pairs $(p_k(q), c_k(q))$ needed to construct the spreading codes. Note that a table of this kind can be used in the second preferred embodiment of a method in accordance with the invention of constructing a spreading code.

The invention naturally concerns also the result of applying this method of constructing a spreading code, namely a family of spreading codes for a direct sequence code division multiple access digital transmission system comprising a plurality of different codes each obtained by this method.

Likewise, the invention is also directed to a device for allocating a spreading code in a direct sequence code division multiple access digital transmission system comprising means for allocating a code specific to one user and obtained by the above method.

Other features and advantages of the invention will emerge from a reading of the following description of one preferred embodiment of the invention given by way of non-limiting illustrative example and from the appended drawing in which the single figure illustrates the method of the invention.

The invention thus concerns a method of constructing a spreading code associated with one user of a Direct Sequence Code Division Multiple access (DS-CDMA) digital transmission system.

A DS-CDMA transmission system is used in a digital mobile radio system, for example. In this case a different spreading code is associated with each mobile station (i.e., each user) connected to a base station.

A spreading code is usually in the form of a pseudo-random binary sequence characterized by its frequency, called the chip frequency, and by the repetition period of the pseudo-random sequence, called the code period.

A data signal to be transmitted is in the form of a binary signal characterized by its bit frequency.

The bit frequency is a multiple of the chip frequency, and the spreading factor of a spreading code is by definition the ratio G between the chip frequency and the bit frequency. The maximal number of elements on which correlation is effected is equal to this spreading factor G.

The data signal transmitted is combined with the spreading code, for example by modulo addition or by multiplication, depending on the nature of the signals. The resulting signal is filtered and then transmitted over a channel.

At the receiving end, after further filtering, decoding is effected by combining the received signal with a local replica of the spreading code synchronized to the transmission.

It is assumed here that:

the receive filtering is matched to the transmit filtering;

an estimate of the impulse response of the channel exists;

synchronization is acquired and perfect, so that the spreading code is perfectly reproduced at the receiving end and aligned with the transmitted spreading code.

Decoding is effected in a "rake" receiver, in the form of:

correlation of the received signal with the spreading code, enabling identification of the path signals which represent the contribution to the received signal of the various paths, and weighting of these path signals using the estimated impulse response of the channel, to produce an estimate of the data signal.

It can be shown that to optimize the performance in the presence of interference the spreading codes must have certain characteristics.

To be more precise:

to combat multi-user interference the spreading codes must have good partial aperiodic cross-correlation properties, and to combat intersymbol interference the spreading codes must have good partial aperiodic autocorrelation properties.

Moreover, to optimize the performance of the rake receiver correlation is effected over a length at most equal to the spreading gain.

BRIEF DESCRIPTION OF THE DRAWINGS

The single FIGURE shows the method of the invention of constructing a family of spreading codes having these partial aperiodic cross-correlation and autocorrelation properties.

DETAILED DESCRIPTION OF THE INVENTION

To construct a spreading code 3 of a family the method of the invention includes at least one stage of concatenating a plurality of different sub-codes 4, namely:

either basic sub-codes 1;

or secondary sub-codes 2.

The basic sub-codes 1 are taken from the same sub-code family and therefore:

are all different, even after circular permutation; and all have the same period.

This family of basic sub-codes 1 is, for example, a family of Gold codes or a family of Kasami codes. In this case the basic sub-codes are obtained using the same pair of generator polynomials, for example.

Take, for example, the period common to all the sub-codes 2 to be equal to the band expansion factor (spreading factor) common to all the spreading codes of the same family.

The secondary sub-codes 2 are obtained by circular permutation of the basic sub-codes 1.

In other words, a spreading code 3 is obtained by concatenating basic sub-codes 1, as such, or after their phase has been changed (in the latter case the sub-codes obtained in this way are called secondary sub-codes 2).

The $k^{th}$ spreading code can be written:

$$S_k = \sum_{q=0}^{n-1} T^{p_k(q)} \cdot a_{c_k(q)}$$

where:

k is the index of said spreading code in said family;

$\Sigma$ signifies concatenation;

q is the concatenation index;

n is the concatenation factor, i.e., the total number of sub-codes to be concatenated to form said spreading codes;

$T^x$ is a circular permutation of x elements;

$a_y$ is a basic sub-code of a family $\{a_y\}$ of basic sub-codes which can be used to coinstruct the sub-codes to be concatenated;

$c_k(q)$ is the function indicating the basic sub-code to be used to construct the $q^{th}$ sub-code to be concatenated in said $k^{th}$ spreading code;

$p_k(q)$ is the function indicating the number of permutations to be effected on the basic sub-code $a_y$ to be considered, with $y=c_k(q)$.

Accordingly, when it is obtained by concatenating n different sub-codes, a spreading code is defined by n pairs $(p_k(q), c_k(q))$, where $q\in[0,n-1]$.

Said method advantageously includes a step of associating a pair $(p_k(q), c_k(q))$ with each value of q.

Accordingly, the $k^{th}$ spreading code can also be defined by a series of n pairs $(p_k(q), c_k(q))$.

It is possible to require that several criteria of choice of these pairs are satisfied, in particular the following two criteria:

$(p_k(q), c_k(q)) \neq (p_j(q), c_j(q))$ for $k \neq j$; and $(p_k(q), c_k(q)) \neq (p_k(j), c_k(j))$ for $q \neq j$.

The first criterion prevents the same sub-code having the same concatenation rank in two different spreading codes.

The second criterion prevents the same sub-code being present more than once in the same spreading code.

$p_k(q)$ takes its values from the set $\{0, \ldots, N-1\}$, where N is the period of each of the sub-codes; N is usually also the spreading factor of the transmission system in which the spreading codes are used.

$c_k(q)$ takes its values from the set $\{0, \ldots, K-1\}$, where K is the number of different basic sub-codes (they are equal to within one permutation).

If the second criterion of choice of the pairs $(p_k(q), c_k(q))$ is satisfied, the number of choices of the spreading codes is limited to $N^2K$.

N permutations can be applied t,D the basic sub-codes, and there are K basic sub-codes, so that there are NK separate pairs $(p_k(q), c_k(q))$. The period of a sub-code is N and, therefore, the maximal period of a spreading code is $N(NK)=N^2K$.

This maximal period is very long compared to that of the structured codes, which is limited by $N^2$, because secondary sub-codes derived from a single basic sub-code are concatenated.

In accordance with the invention, partial aperiodic cross-correlation between two spreading codes for starting indices which are multiples of the spreading factor is equivalent to aperiodic cross-correlation over the two sub-codes constituting the spreading codes for the times pN, where p is an integer.

Because of the first criterion of choice for the pairs $(p_k(q), c_k(q))$, and for starting indices which are multiples of the spreading factor, partial aperiodic cross- is equivalent to:

either aperiodic cross-correlation between two different sub-codes;

or aperiodic autocorrelation on one sub-code.

If the starting indices are multiples of the spreading factor, the aperiodic cross-correlation and autocorrelation properties of the sub-codes are recovered for the partial aperiodic cross-correlation and autocorrelation of the spreading codes with a maximal correlation length equal to the period of a sub-code.

Likewise, in accordance with the invention, for starting indices which are multiples of the spreading factor, partial aperiodic autocorrelation on one spreading code is equivalent:

either to aperiodic cross-correlation between two different sub-codes;

or to aperiodic autocorrelation on one sub-code.

If the starting indices are multiples of the spreading factor, the aperiodic autocorrelation and cross-correlation properties of the sub-codes are recovered for partial aperiodic autocorrelation of the spreading codes with a maximal correlation length equal to the period of a sub-code.

Note that:

for "downlink" transmission, in which the users are synchronized, aperiodic partial auto-correlation and cross-correlation are relevant for starting indices which are multiples of the spreading factor; and for "uplink" transmission, in which users are not synchronized, the following are relevant:

* aperiodic partial cross-correlations for any indices, and,

* aperiodic partial autocorrelations for indices which are multiples of the spreading factor.

It is therefore seen that the invention applies better to downlink transmission.

In accordance with the invention, the stage of concatenating a plurality of sub-codes to construct a spreading code is preceded by a stage of associating a pair $(p_k(q), c_k(q))$ with each value of q As discussed previously, any such association can be made to conform to the following two criteria:

$(p_k(q), c_k(q)) \neq (p_j(q), c_j(q))$ for $k \neq j$; and $(p_k(q), c_k(q)) \neq (p_k(j), c_k(j))$ for $q \neq j$.

There are various conceivable with to implement this association stage.

In a first implementation this stage of associating a pair $(p_k(q), c_k(q))$ with each value of q can entail calculating the values $p_k(q)$ and $c_k(q)$ using a function parameterized by the index k.

In a second implementation this stage of associating a pair $(p_k(q), c_k(q))$ with each value of q can entail reading the values of $p_k(q)$, and $c_k(q)$ in a table previously generated using a function parametered by the index k.

In the latter case, one example of the process of generating a table of this kind can comprise the following stages:

a number K of available basic sub-codes is chosen;

pairs $(p_k(q), c_k(q))$ are generated iteratively from the index k and from the index q.

This iterative generation entails, for example:

* choosing a variable $V_k(q) = p_k(q) \cdot K + c_k(q)$ where $V_k(q)$ is the smallest integer such that:

$V_k(q) < K \cdot N$ where N is the period of the sub-codes;

$V_k(q) \neq V_k(q')$ for all $q' < q$, where $q'$ corresponds to all values of q for which a pair $(p_k(q), c_k(q))$ has already been calculated;

$V_{k'}(q) \neq V_k(q)$ for all $k' < k$, where $k'$ corresponds to all values of k for which a pair $(p_k(q), c_k(q))$ has already been calculated;

effecting the integer division of $V_k(q)$ by K to obtain the values $p_k(q)$ and $c_k(q)$.

Also, the devices for allocating codes in a direct sequence code division multiple access digital transmission system are part of the prior art and need not be described in detail. However, the invention adds to these devices means for allocating a user a personal code obtained by the above described method of constructing a spreading code. The available codes are stored in a memory, for example.

There is claimed:

1. A method of constructing a spreading code signal associated with one user of a direct sequence code division multiple access digital transmission system, comprising the steps of:

constructing said spreading code signal by performing at least one stage of concatenating a plurality of different sub-codes, including:

at least two cyclically different basic sub-codes belonging to the same family of basic sub-codes; and at least one secondary sub-code obtained by circular permutation of one of said basic sub-codes; and designating said spreading code signal as being associated with said one user.

2. A method according to claim 1, wherein the period of said sub-codes is equal to the spreading gain of said transmission system.

3. A method according to claim 1, wherein said family of basic sub-codes belongs to the group comprising:

the family of Gold codes; and the family of Kasami codes.

4. A method according to claim 1, wherein said spreading code belongs to a family of at least two separate spreading codes, and in that said spreading code can be written:

$$S_k = \sum_{q=0}^{n-1} T_k^{p(q)} \cdot a_{c_k(q)}$$

where:

k is the index of said spreading code in said family;

$\Sigma$ signifies concatenation;

q is the concatenation index;

n is the concatenation factor, i.e. the total number of sub-codes to be concatenated to form said spreading codes;

$T^x$ is a circular permutation of x elements;

$a_y$ is a basic sub-code of a family $\{a_y\}$ of basic sub-codes which can be used to construct the sub-codes to be concatenated;

$c_k(q)$ is the function indicating the basic sub-code to be used to construct the $q^{th}$ sub-code to be concatenated in said $k^{th}$ spreading code;

$p_k(q)$ is the function indicating the number of permutations to be effected on the basic sub-code $a_y$ to be considered, with $y = c_k(q)$.

5. A method according to claim 4, including a step of associating a pair $(p_k(q), c_k(q))$ with each value of q.

6. A method according to claim 5, wherein said step of associating a pair $(p_k(q), c_k(q))$ with each value of q is such that the same sub-code cannot have the same concatenation rank in said spreading code and in any other spreading code of said family of spreading codes.

7. A method according to claim 5, wherein said step of associating a pair $(p_k(q), c_k(q))$ with each value of q is such that the same sub-code cannot be present more than once in said spreading code.

8. A method according to claim 5, wherein said step of associating a pair $(p_k(q), c_k(q))$ with each value of q consists of calculating said values $p_k(q)$ and $c_k(q)$ using a function parameterized by said index k of said spreading code in said family.

9. A method according to claim 5, wherein said stage of associating a pair $(p_k(q), c_k(q))$ with each value of g consists of reading said values $p_k(q)$ and $c_k(q)$ in a table previously generated using a function parameterized by said index k of said spreading code in said family.

10. A method of generating a table of the type used in a method according to claim 9, of constructing a spreading code, said table associating, for each of said spreading codes indexed by k, a pair of values $(p_k(q), c_k(q))$ with each concatenation index q, said method comprising the following steps:

choosing a number K of available basic sub-codes;

generating pairs $(p_k(q), c_k(q))$ iteratively from the spreading code index k in said family and from the concatenation index q, said iterative generation entailing:
* choosing a variable $V_k(q)=p_k(q)*K+c_k(q)$ where $V_k(q)$ is the smallest integer such that:

$V_k(q)<K.N$ where N is the period of the sub-codes;

$V_k(q) \neq V_k(q')$ for all q'<q, where q' corresponds to all values of q for which a pair $(p_k(q), c_k(q))$ has already been calculated;

$V_k'(q) \neq V_k(q)$ for all k'<k, where k' corresponds to all values of k for which a pair $(p_k(q), c_k(q))$ has already been calculated;
* effecting the integer division of $V_k(q)$ by K to obtain the values $p_k(q)$ and $c_k(q)$.

11. A method of generating a family of spreading code signals for a direct sequence code division multiple access digital transmission system, said family of spreading code signals comprising a plurality of different spreading code signals, said method comprising the steps of:

constructing each of said spreading code signals by performing at least one stage of concatenating a plurality of different sub-codes, including:
at least two cyclically different basic sub-codes belonging to the same family of basic sub-codes; and
at least one secondary sub-code obtained by circular permutation of one of said basic sub-codes; and
designating said each of said spreading code signals as being associated with a respective user of said direct sequence code division multiple access digital transmission system.

12. A device for allocating a spreading code in a direct sequence code division multiple access digital transmission system, comprising:

means for constructing said spreading code by performing at least one stage of concatenating a plurality of different sub-codes, including:
at least two cyclically different basic sub-codes belonging to the same family of basic sub-codes; and
said at least one secondary sub-code obtained by circular permutation of one of said basic sub-codes; and
means for allocating said spreading code to one user of said direct sequence code division multiple access digital transmission system.

13. A method of transmitting a direct sequence code division multiple access (DS-CDMA) signal, said method comprising the steps of combining a data signal with a spreading code to obtain said DS-CDMA signal, and transmitting said DS-CDMA signal, the improvement characterized in that said spreading code comprises a concatenation of a plurality of different sub-codes, said different subcodes comprising:

at least two cyclically different basic sub-codes belonging to a family of sub-codes; and at least one secondary sub-code obtained by circular permutation of one of said basic sub-codes.

14. A device for allocating a spreading code to a specific one of a plurality of users in a direct sequence code division multiple access (DS-CDMA) system, for use in a DS-CDMA system wherein a data signal at said user is combined with said spreading code to obtain a DS-CDMA signal to be transmitted to a receiver, and said receiver recovers said data signal by applying said spreading code to the received signal, said device comprising:

means for concatenating a plurality of different sub-codes to obtain said spreading code, said different subcodes comprising:
at least two cyclically different basic sub-codes belonging to a family of sub-codes; and
at least one secondary sub-code obtained by circular permutation of one of said basic sub-codes; and
means for allocating said spreading code to said specific user.

15. A method of allocating a spreading code to a specific one of a plurality of users, in a direct sequence code division multiple access (DS-CDMA) system wherein a data signal at said specific user is combined with said spreading code to obtain a DS-CDMA signal to be transmitted to a different one of said users, and said different user recovers said data signal by applying said spreading code to the received signal, said method comprising the steps of generating at least one spreading code and assigning said spreading code to said specific user, the improvement characterized in that said generating step comprises concatenating a plurality of different sub-codes to obtain said spreading code, said different subcodes comprising:

at least two cyclically different basic sub-codes belonging to a family of sub-codes; and at least one secondary sub-code obtained by circular permutation of one of said basic sub-codes.

16. A method according to claim 15, wherein said generating step comprises generating a plurality of said spreading codes to obtain a family of spreading codes, each spreading code in said family including different sub-codes in accordance with claim 15, and said assigning step comprises assigning a specific one of said family of spreading codes to said specific user.

* * * * *